US011879904B2

(12) United States Patent
Nonaka et al.

(10) Patent No.: US 11,879,904 B2
(45) Date of Patent: *Jan. 23, 2024

(54) METHOD OF WASHING AN ASPIRATION PROBE OF AN IN-VITRO DIAGNOSTIC SYSTEM, IN-VITRO DIAGNOSTIC METHOD, AND IN-VITRO DIAGNOSTIC SYSTEM

(71) Applicants: Roche Diagnostics Operations, Inc., Indianapolis, IN (US); Hitachi High-Technologies Corporation, Tokyo (JP)

(72) Inventors: Kouhei Nonaka, Tokyo (JP); Takamichi Mori, Tokyo (JP); Yoichi Aruga, Tokyo (JP); Yosuke Horie, Tokyo (JP); Andrew McCaughey, Baar (CH); Alexander Seiler, Habach (DE)

(73) Assignees: Roche Diagnostics Operations, Inc., Indianapolis, IN (US); Hitachi High-Technologies Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,874

(22) Filed: Oct. 22, 2021

(65) Prior Publication Data

US 2022/0113331 A1    Apr. 14, 2022

Related U.S. Application Data

(60) Division of application No. 16/434,698, filed on Jun. 7, 2019, now Pat. No. 11,169,169, which is a
(Continued)

(51) Int. Cl.
*G01N 35/10* (2006.01)
*B01L 3/02* (2006.01)
(Continued)

(52) U.S. Cl.
CPC ..... *G01N 35/1004* (2013.01); *G01N 35/1009* (2013.01); *B01F 31/00* (2022.01);
(Continued)

(58) Field of Classification Search
None
See application file for complete search history.

(56) References Cited

U.S. PATENT DOCUMENTS 5,065,574 A    11/1991  Bailey
6,752,960 B1 *  6/2004  Matsubara ......... G01N 35/1004
                                              422/62
(Continued)

FOREIGN PATENT DOCUMENTS

CN          1788198       6/2006
CN         105170548     12/2015
(Continued)

OTHER PUBLICATIONS

Machine generated English translation of JP-2001-91523 (Year: 2001).*
Machine genrated English translation of DE3614960 (1996).*

*Primary Examiner* — P. Kathryn Wright
(74) *Attorney, Agent, or Firm* — Woodard, Emhardt, Henry, Reeves & Wagner, LLP (57) ABSTRACT

A method of washing an aspiration probe of an in-vitro diagnostic system is disclosed. The aspiration probe comprises an outer surface and an inner surface forming an inner space for receiving a fluid. The method comprises dipping the aspiration probe into a first wash fluid so that the outer surface is immersed at least in part into the first wash fluid, aspirating an amount of the first wash fluid into the inner space of the aspiration probe, propagating an ultrasonic vibration to the outer surface of the aspiration probe via the first wash fluid, and rinsing the outer surface and the inner
(Continued)

surface of the aspiration probe with a second wash fluid. Further, an in-vitro diagnostic method and an in-vitro diagnostic system are disclosed.

9 Claims, 7 Drawing Sheets

Related U.S. Application Data continuation of application No. PCT/EP2016/082533, filed on Dec. 23, 2016.

(51) Int. Cl.
    *G01N 35/00*     (2006.01)
    *B01F 31/00*     (2022.01)

(52) U.S. Cl.
    CPC .. *B01L 3/0275* (2013.01); *G01N 2035/00524* (2013.01); *G01N 2035/00554* (2013.01)

(56) References Cited

U.S. PATENT DOCUMENTS

| | | |
|---|---|---|
| 2006/0179946 A1 | 8/2006 | Wilson |
| 2006/0213257 A1* | 9/2006 | Togashi ............. G01N 35/1004 73/864.22 |
| 2008/0141762 A1* | 6/2008 | Togashi ................. B01L 13/02 73/61.55 |
| 2011/0214691 A1 | 9/2011 | Miyajima et al. |

FOREIGN PATENT DOCUMENTS

| | | |
|---|---|---|
| CN | 105378450 | 3/2016 |
| DE | 3614960 A1 * | 2/1996 |
| EP | 0888553 | 9/2002 |
| EP | 1624301 | 2/2006 |
| EP | 2 025 418 | 2/2009 |
| JP | H051983 | 1/1993 |
| JP | 1992-169850 A | 6/1994 |
| JP | H082184 | 1/1996 |
| JP | H1019901 | 1/1998 |
| JP | H11211731 | 8/1999 |
| JP | 2945746 | 9/1999 |
| JP | 2000208242 | 7/2000 |
| JP | 2001-91523 A * | 4/2001 |
| JP | 2009503453 | 1/2009 |
| JP | 2009121873 | 6/2009 |
| JP | 2010133727 | 6/2010 |
| JP | 2010166178 | 7/2010 |
| JP | 5668128 | 2/2015 |
| JP | 2015158426 | 9/2015 |
| JP | 2016096508 | 5/2016 |
| JP | 2016156675 | 9/2016 |
| JP | 2018-048892 A | 2/2021 |
| WO | WO 2014/127379 A1 | 8/2014 |

* cited by examiner

METHOD OF WASHING AN ASPIRATION PROBE OF AN IN-VITRO DIAGNOSTIC SYSTEM, IN-VITRO DIAGNOSTIC METHOD, AND IN-VITRO DIAGNOSTIC SYSTEM

TECHNICAL FIELD

Disclosed herein are a method of washing an aspiration probe of an in-vitro diagnostic system, an in-vitro diagnostic method, and an in-vitro diagnostic system.

BACKGROUND

In-vitro diagnostic testing has a major effect on clinical decisions, providing physicians with pivotal information. Particularly there is great emphasis on providing quick and accurate test results in critical care settings. In-vitro diagnostic testing is usually performed using instruments operable to execute one or more processing steps/workflow steps on one or more biological samples and/or one or more reagents, such as pre-analytical instruments, post-analytical instruments and also analytical instruments.

Analytical instruments/analyzers are configured to obtain a measurement value. An analyzer is operable to determine via various chemical, biological, physical, optical or other technical procedures a parameter value of the sample or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An analytical instrument may comprise units assisting with the pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis. Examples of such analyzer are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

In an automatic analyzer, in order to dispense a fluid such as a sample or reagent by repeatedly using the same aspiration probe or nozzle, a nozzle tip end is cleaned before aspirating a different fluid. When the nozzle tip end is not sufficiently cleaned, the previous sample component is carried over the next sample, and measurement accuracy deteriorates (carry-over). The carry-over may be caused by proteins/lipids/other substances found in the fluid, which are attached to the aspiration probe, and are not removed during normal aspiration probe washing. The clinical significance of the contamination is dependent on the sensitivity/level of detection of the assay being tested. Assays which measure analytes at very low concentration typically are thus affected, and if no mitigation for the contamination is available, this can lead to incorrectly reported patient results.

Methods of washing an aspiration probe using ultrasonic vibration for improved washing efficiency are disclosed for example in JP-A-4-169850 and JP-A-2010-133727. The washing effect of ultrasonic vibration is mainly due to cavitation, a phenomenon in which bubbles are generated or extinguished due to a pressure difference generated in a liquid.

However, with such disclosed methods, it is difficult to obtain a high cleaning effect while suppressing cleaning unevenness. Moreover, as the cavitation effect is principally targeting the outer surface of the aspiration probe, ultrasonic washing is not effective to clean also the inner surface of the aspiration probe. Particularly, the known methodology employed for cleaning an aspiration probe often lead to residual contamination above 0.1 ppm and slowing of the analytical system due to time needed to perform the cleaning step. Neither of these outcomes is acceptable for the routine laboratory work, and more drastic and costly workarounds may be required such as for example the use of disposable tips.

SUMMARY

Embodiments of the disclosed method and system aim to provide a high cleaning effect for both the outer surface and the inner surface of the aspiration probe, with residual carryover levels of much less than 0.1 ppm. Also, the cleaning unevenness can be suppressed and without slowing down the analytical or diagnostic process of the system.

Disclosed herein are a method of washing an aspiration probe of an in-vitro diagnostic system, an in-vitro diagnostic method, and an in-vitro diagnostic system.

Embodiments of the disclosed method of washing an aspiration probe of an in-vitro diagnostic system, in-vitro diagnostic method, and in-vitro diagnostic system have the features of the independent claims. Further embodiments of the invention, which may be realized in an isolated way or in any arbitrary combination, are disclosed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "particularly", "more particularly", "specifically", "more specifically" or similar terms are used in conjunction with additional/alternative features, without restricting alternative possibilities. Thus, features introduced by these terms are additional/ alternative features and are not intended to restrict the scope of the claims in any way. The invention may, as the skilled person will recognize, be performed by using alternative features. Similarly, features introduced by "in an embodiment of the invention" or similar expressions are intended to be additional/alternative features, without any restriction regarding alternative embodiments of the invention, without any restrictions regarding the scope of the invention and without any restriction regarding the possibility of combining the features introduced in such way with other additional/alternative or non-additional/alternative features of the invention.

According to the disclosed method of washing an aspiration probe of an in-vitro diagnostic system, the aspiration probe comprising an outer surface and an inner surface forming an inner space for receiving a fluid, the method comprises dipping the aspiration probe into a first wash fluid so that the outer surface is immersed at least in part into the first wash fluid, aspirating an amount of the first wash fluid into the inner space of the aspiration probe, propagating an ultrasonic vibration to the outer surface of the aspiration probe via the first wash fluid, and rinsing the outer surface and the inner surface of the aspiration probe with a second wash fluid.

The term "aspiration probe" as used herein refers to a device configured to withdraw or aspirate a fluid such as a sample or reagent. For this reason, usually, the aspiration probe is part of a pipettor and is fastened to a movable arm, dips from above into the sample vessel and an appropriate amount of sample is aspirated in and transferred in the probe, which is also known as transfer needle or nozzle, to a predetermined position such as a reaction vessel for initiating a chemical, biological or the like reaction.

The term "dip" as used herein refers to a process of submerging a constructional member into a fluid. Thus, with the disclosed method, the probe is submerged into the first wash fluid such that the first wash fluid contacts at least the outer surface of the probe.

The term "aspirate" as used herein refers to a process of drawing or sucking a fluid into a predetermined volume or space. Thus, with the disclosed method, the first wash fluid is drawn or sucked into the interior of the probe.

The term "propagate ultrasonic vibration" as used herein refers to a process of exposing a constructional member to ultrasound waves. Ultrasound is sound waves with frequencies higher than the upper audible limit of human hearing. This limit varies from person to person and is approximately 20 kHz. Thus, with the disclosed method, the outer surface of the probe is exposed to ultrasonic vibration.

The term "rinse" as used herein refers to a process of washing a surface of a constructional member. Thus, with the disclosed method, the outer and inner surfaces of the probe are washed with a second wash fluid, which typically is different from the first wash fluid.

Thus, the aspiration probe surfaces are cleaned thoroughly in a first wash fluid in the presence of ultrasonic radiation in order to remove internal and external contamination. The aspiration probe is then washed before aspirating the next sample. The application of ultrasonic vibration in the presence of the first wash fluid causes cavitation and cleaning of the outside surface of the aspiration probe. Aspiration of the first wash fluid into the aspiration probe, in addition to the application of the ultrasonic vibration, is effective at cleaning the inside surface of the aspiration probe as well. The frequency of the ultrasound and cycle time of the cleaning process may thus be optimized to achieve effective cleaning within a rather short time such as a few seconds, which makes the methodology appropriate for routine use without slowing down the analytical process.

Any one or more of the individual method steps may be repeated. Thus, the above described advantages and effects may be increased. In particular, it may be advantageous to repeat aspiration of the first wash fluid more than once, e.g. at least twice in order to make the cleaning of the inside surface even more effective. In this case, the step of aspirating the first wash fluid may be alternated by the step of discharging the first wash fluid and rinsing the nozzle with the second wash fluid. Also, depending on the particular nozzle construction, e.g. inner diameter and material, and aspiration conditions like speed, aspirating the first wash fluid or repeating aspiration and dispensing steps continuously, e.g. via sip end spit, during propagation of the ultrasonic vibration, may have the additional advantage of to some extent partially transferring the cavitation effect also to the inside of the nozzle, thereby resulting in even more effective cleaning.

The first wash fluid may be a chemically aggressive fluid. The term "chemically aggressive fluid" as used herein refers to any fluid that is aggressive relative to potential contaminants located on the surfaces of the probe. Thus, any contaminants adhering to the surfaces of the probe may be reliably removed.

The first washing fluid may be an alkaline solution. For example, the first wash fluid is sodium hydroxide solution.

The alkaline solution may comprise a detergent. The term "detergent" as used herein refers to a surfactant or a mixture of surfactants with cleaning properties in dilute solutions.

The second wash fluid may be water. Thus, after treatment with the second wash fluid, the probe is ready to be used again.

According to the disclosed in-vitro diagnostic method, the method comprises sequentially aspirating different test fluids or different aliquots of a test fluid with a reusable aspiration probe, wherein the method further comprises washing the aspiration probe according to any of the above steps before and/or after aspirating the test fluid and/or at maintenance intervals. Thus, any contaminants on the surfaces of the aspirating probe may be removed such that the aspirating probe may be re-used without the risk of any significant carryover effect.

The method may further comprise performing at least one of or a combination of any two or more of an immunochemical test, a clinical chemical test, a nucleic acid test, a coagulation test, a hematology test, a mass spectrometric test. Thus, the method of washing may be integrated into a plurality of different analytical tests.

According to the disclosed in-vitro diagnostic method, the method comprises performing a diagnostic test with lower susceptibility to carryover and a diagnostic test with higher susceptibility to carryover comprising sequentially aspirating different respective test fluids with a reusable aspiration probe, the method comprising washing the aspiration probe between diagnostic tests, wherein washing the aspiration probe before performing the diagnostic test with higher susceptibility to carry over is performed according to any of the above steps and washing the aspiration probe before performing the diagnostic test with lower susceptibility to carry over comprises only or exclusively rinsing the outer surface and the inner surface of the aspiration probe with the second wash fluid. Thus, the method of washing may be adapted to the respective process as appropriate.

The diagnostic test with lower susceptibility to carryover may be a clinical chemical test and the diagnostic test with higher susceptibility to carryover may be an immunochemical test. Thus, the method of washing may be adapted even to rather sensitive tests.

According to the disclosed in-vitro diagnostic system, the system comprises:
- an aspiration probe comprising an outer surface and an inner surface forming an inner space for receiving a fluid,
- a first probe wash station comprising a first wash chamber holding a first wash fluid and an ultrasonic cleaner comprising an ultrasonic vibrator that propagates an ultrasonic vibration to the outer surface of the aspiration probe via the first wash fluid,
- a second probe wash station comprising a second wash chamber for rinsing the aspiration probe with a second wash fluid.

The term "probe wash station" as used herein refers to any location or position within the diagnostic system where the workflow provides for a washing step of the probe.

The term "wash chamber" as used herein refers to any container configured to hold a predetermined volume of a wash fluid.

The term "ultrasonic cleaner" as used herein refers to any device configured to use ultrasound and an appropriate cleaning solvent to clean items. Ultrasonic cleaning uses cavitation bubbles induced by high frequency pressure (sound) waves to agitate a liquid. The agitation produces high forces on contaminants adhering to substrates like metals, plastics, glass, rubber, and ceramics.

The term "ultrasonic vibrator" as used herein refers to a device configured to emit ultrasound vibrations. Vibration is a mechanical phenomenon whereby oscillations occur about an equilibrium point. The oscillations may be periodic or random.

Thus, system is suitable to thoroughly clean the aspiration probe surfaces in a first wash fluid in the presence of ultrasonic vibration in order to remove internal and external contamination. The aspiration probe may then be washed before aspirating the next sample. The application of ultrasonic vibration in the presence of the first wash fluid causes cavitation and cleaning of the outer surface of the aspiration probe. Aspiration of the first wash fluid into the aspiration probe, in addition to the application of the ultrasonic vibration, is effective at cleaning the inside surface of the aspiration probe as well. The frequency of the ultrasound and cycle time of the cleaning process may thus be optimized to achieve effective cleaning within a rather short time such as a few seconds, which makes the system appropriate for routine use without slowing down the analytical process.

The ultrasonic vibrator may comprise a cleaning head, the cleaning head comprising a longitudinal body and a tip protruding from the longitudinal body that is insertable into the first wash chamber and into the first wash fluid, the tip comprising a through hole having a diameter greater than the diameter of the aspiration probe that is fillable with the first wash fluid when the tip is inserted in the first wash chamber and into which at least part of the aspiration probe can be inserted. In other words, the cleaning head has a shape of surrounding the probe similar to the cylindrical shape. In the cylindrical part of the tip end part, a hole having a diameter greater than that of the tip end of the probe is open. Therefore, the cleaning head has a hollow part serving as probe insertion port, the probe can be inserted into the hollow part, and the hollow part is filled with the first wash fluid. The cleaning of the probe can be carried out by vibrating the cleaning head in a state where the probe is inserted into the hollow part. Thus, the ultrasonic vibration propagates to the probe at a rather small distance allowing to effectively clean the probe in an even manner (suppressing the cleaning unevenness).

The ultrasonic vibrator may comprise one or more piezoelectric elements fixed between at least a back mass and a front mass connected to the cleaning head for generating the ultrasonic vibration and propagating the ultrasonic vibration through the cleaning head to the first wash fluid in the hole of the tip and through the first wash fluid to the aspiration probe inserted into the hole. Thus, the ultrasonic vibrator may be effectively driven.

The front mass may have a tapered shape. In other words, the front mass may have a shape whose diameter on the piezoelectric element side and on the tip end side changes. Thus, it is possible to amplify the generated amplitude of the piezoelectric element.

The in-vitro diagnostic system may further comprise a controller for driving the ultrasonic vibrator, and for controlling that vibration frequency and/or temperature of the first wash fluid in the first wash chamber remain within predefined ranges. Thus, the operation of the ultrasonic vibrator may be automated and reliably controlled.

The in-vitro diagnostic system may comprise at least one automatic analyzer to analyze biological samples, the at least one automatic analyzer comprising
- a first aspiration unit to aspirate and dispense a biological sample into a reaction container by the aspiration probe as a first aspiration probe, where the first aspiration probe is a reusable probe,
- a second aspiration unit to aspirate and dispense a biological sample by a second aspiration probe, where the second aspiration probe is a disposable tip, and
- a controller to control the ultrasonic cleaner and the first and second aspiration units,
- wherein the ultrasonic cleaner further comprises a supply section to supply the first wash fluid to wash the first aspiration probe,
- wherein the controller determines which of the first and second aspiration units aspirates the biological sample first, and
- wherein in case it is determined by the controller that the biological sample in the same sample container is to be aspirated first by the first aspiration unit and second by the second aspiration unit in this order, the controller controls the ultrasonic cleaner to propagate the ultrasonic vibration to the outer surface of the first aspiration probe before the first aspiration unit aspirates the biological sample.

Thus, the disclosed principle of washing a probe may be well integrated into the workflow of automatic analyzers.

The first aspiration unit may dispense the biological sample into one of first reaction containers of a first group and the second aspiration unit dispense the biological sample into one of second reaction containers of a second group which is different from the first group, and wherein the first reaction containers are used for colorimetric inspection items and the second reaction containers are used for immune inspection items. Thus, the probe may be washed between the respective reaction steps and positions.

The in-vitro diagnostic system may further comprise a sample transfer unit for transferring a plurality of sample containers to the first and second aspiration units. Thus, the disclosed principle of washing a probe may be integrated into highly automated devices or apparatus.

The in-vitro diagnostic system may further comprise a first automatic analyzer comprising the first aspiration unit, the first probe wash station and the second probe wash station, and a second automatic analyzer comprising the second aspiration unit comprising a respective first probe wash station and second probe wash station, wherein the sample transfer unit is configured to transfer at least one carrier having at least one sample container between the first and second automatic analyzers.

The in-vitro diagnostic system may further comprise a setting unit for setting wash conditions of the first aspiration probe corresponding to an immune inspection item and for selecting whether the ultrasonic vibrator propagates the ultrasonic vibration to the outer surface of the first aspiration probe or not as one of the wash conditions, wherein in a case an immune inspection item, for which it is selected that the ultrasonic vibrator propagates the ultrasonic vibration, and a colorimetric inspection item are requested for the same biological sample, and in the case the biological sample is to be aspirated first by the first aspiration unit and second by the second aspiration from the same sample container in this order, the controller controls the ultrasonic cleaner to propagate the ultrasonic vibration to the outer surface of the first aspiration probe before the first aspiration unit aspirates the biological sample.

A priority aspiration flag for the immune inspection item may be set as analysis condition of the immune inspection item by the setting unit, wherein in a case an immune inspection item, for which the priority aspiration flag is ON and for which it is not selected that the ultrasonic vibrator propagates the ultrasonic vibration, and a colorimetric inspection item are requested for the same biological sample, the controller controls the sample transfer unit such that the biological sample is transferred first to the second aspiration unit and second to the first aspiration unit in this order.

The invention further discloses and proposes a computer program including computer-executable instructions for performing the method according to the present invention in one or more of the embodiments enclosed herein when the program is executed on a computer or computer network. Specifically, the computer program may be stored on a computer-readable data carrier. Thus, specifically, one, more than one or even all of method steps as indicated above may be performed by using a computer or a computer network, preferably by using a computer program. The invention further discloses and proposes a computer program product having program code means, in order to perform the method according to the present invention in one or more of the embodiments enclosed herein when the program is executed on a computer or computer network. Specifically, the program code means may be stored on a computer-readable data carrier.

Further, the invention discloses and proposes a data carrier having a data structure stored thereon, which, after loading into a computer or computer network, such as into a working memory or main memory of the computer or computer network, may execute the method according to one or more of the embodiments disclosed herein.

The invention further proposes and discloses a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, the invention proposes and discloses a modulated data signal which contains instructions readable by a computer system or computer network, for performing the method according to one or more of the embodiments disclosed herein.

Preferably, referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the present invention further discloses:
A computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network, and
a computer program product having program code means, wherein the program code means can be stored or are stored on a storage medium, for performing the method according to one of the embodiments described in this description, if the program code means are executed on a computer or on a computer network.

Summarizing the findings of the present invention, the following embodiments are preferred:

Embodiment 1: A method of washing an aspiration probe of an in-vitro diagnostic system, the aspiration probe comprising an outer surface and an inner surface forming an inner space for receiving a fluid, the method comprising:
dipping the aspiration probe into a first wash fluid so that the outer surface is immersed at least in part into the first wash fluid,
aspirating an amount of the first wash fluid into the inner space of the aspiration probe,
propagating an ultrasonic vibration to the outer surface of the aspiration probe via the first wash fluid, and rinsing the outer surface and the inner surface of the aspiration probe with a second wash fluid.

Embodiment 2: The method according to embodiment 1 comprising repeating any one or more of the individual steps.

Embodiment 3: The method according to embodiment 1 or 2 wherein the first wash fluid is a chemically aggressive fluid.

Embodiment 4: The method according to embodiment 3 wherein the first washing fluid is an alkaline solution.

Embodiment 5: The method according to embodiment 3 or 4 wherein the alkaline solution comprises a detergent.

Embodiment 6: The method according to any of the preceding embodiments wherein the second wash fluid is water.

Embodiment 7: An in-vitro diagnostic method comprising sequentially aspirating different test fluids or different aliquots of a test fluid with a reusable aspiration probe, wherein the method comprises washing the aspiration probe according to any of the embodiments 1 to 6 before and/or after aspirating a test fluid and/or at maintenance intervals.

Embodiment 8: The in-vitro diagnostic method according to embodiment 7 wherein the method comprises performing at least one of or a combination of any two or more of an immunochemical test, a clinical chemical test, a nucleic acid test, a coagulation test, a hematology test, a mass spectrometric test.

Embodiment 9: An in-vitro diagnostic method comprising performing a diagnostic test with lower susceptibility to carryover and a diagnostic test with higher susceptibility to carryover comprising sequentially aspirating different respective test fluids with a reusable aspiration probe, the method comprising washing the aspiration probe between diagnostic tests, wherein washing the aspiration probe before performing the diagnostic test with higher susceptibility to carry over is performed according to any of the embodiments 1 to 6 and washing the aspiration probe before performing the diagnostic test with lower susceptibility to carry over comprises only rinsing the outer surface and the inner surface of the aspiration probe with the second wash fluid.

Embodiment 10: The in-vitro diagnostic method according to embodiment 8 wherein the diagnostic test with lower susceptibility to carryover is a clinical chemical test and the diagnostic test with higher susceptibility to carryover is an immunochemical test.

Embodiment 11: An in-vitro diagnostic system comprising:
  an aspiration probe comprising an outer surface and an inner surface forming an inner space for receiving a fluid,
  a first probe wash station comprising a first wash chamber holding a first wash fluid and an ultrasonic cleaner comprising an ultrasonic vibrator that propagates an ultrasonic vibration to the outer surface of the aspiration probe via the first wash fluid,
  a second probe wash station comprising a second wash chamber for rinsing the aspiration probe with a second wash fluid.

Embodiment 12: The in-vitro diagnostic system according to embodiment 11, wherein the ultrasonic vibrator comprises a cleaning head, the cleaning head comprising a longitudinal body and a tip protruding from the longitudinal body that is insertable into the first wash chamber and into the first wash fluid, the tip comprising a through hole having a diameter greater than the diameter of the aspiration probe that is fillable with the first wash fluid when the tip is inserted in the first wash chamber and into which at least part of the aspiration probe can be inserted.

Embodiment 13: The in-vitro diagnostic system according to embodiment 12 wherein the ultrasonic vibrator comprises one or more piezoelectric elements fixed between at least a back mass and a front mass connected to the cleaning head for generating the ultrasonic vibration and propagating the ultrasonic vibration through the cleaning head to the first wash fluid in the hole of the tip and through the first wash fluid to the aspiration probe inserted into the hole.

Embodiment 14: The in-vitro diagnostic system according to embodiment 13 wherein the front mass has a tapered shape.

Embodiment 15: The in-vitro diagnostic system according to any of the embodiments 11 to 14 further comprising a controller for driving the ultrasonic vibrator, and for controlling that vibration frequency and/or temperature of the first wash fluid in the first wash chamber remain within predefined ranges.

Embodiment 16: The in-vitro diagnostics system according to any of the embodiments 11 to 14 wherein the in-vitro diagnostic system comprises at least one automatic analyzer to analyze biological samples, the at least one automatic analyzer comprising:
  a first aspiration unit to aspirate and dispense a biological sample into a reaction container by the aspiration probe as a first aspiration probe, where the first aspiration probe is a reusable probe,
  a second aspiration unit to aspirate and dispense a biological sample by a second aspiration probe, where the second aspiration probe is a disposable tip, and
  a controller to control the ultrasonic cleaner and the first and second aspiration units,
wherein the ultrasonic cleaner further comprises a supply section to supply the first wash fluid to wash the first aspiration probe,
wherein the controller determines which of the first and second aspiration units aspirates the biological sample first, and
wherein in case it is determined by the controller that the biological sample in the same sample container is to be aspirated first by the first aspiration unit and second by the second aspiration unit in this order, the controller controls the ultrasonic cleaner to propagate the ultrasonic vibration to the outer surface of the first aspiration probe before the first aspiration unit aspirates the biological sample.

Embodiment 17: The in-vitro diagnostic system according to embodiments 16,
wherein the first aspiration unit dispenses the biological sample into one of first reaction containers of a first group and the second aspiration unit dispenses the biological sample into one of second reaction containers of a second group which is different from the first group, and wherein the first reaction containers are used for colorimetric inspection items and the second reaction containers are used for immune inspection items.

Embodiment 18: The in-vitro diagnostic system according to embodiments 16 or 17,
further comprising a sample transfer unit for transferring a plurality of sample containers to the first and second aspiration units.

Embodiment 19: The in-vitro diagnostic system according to embodiment 18, further comprising:
  a first automatic analyzer comprising the first aspiration unit, the first probe wash station and the second probe wash station, and a second automatic analyzer comprising the second aspiration unit,
wherein the sample transfer unit can transfer at least one carrier having at least one sample container between the first and second automatic analyzers.

Embodiment 20: The in-vitro diagnostic system according to any of the embodiments 17 to 19, further comprising a setting unit for setting wash conditions of the first aspiration probe corresponding to an immune inspection item and for selecting whether the ultrasonic vibrator propagates the ultrasonic vibration to the outer surface of the first aspiration probe or not as one of the wash conditions,
wherein in a case an immune inspection item, for which it is selected that the ultrasonic vibrator propagates the ultrasonic vibration, and a colorimetric inspection item are requested for the same biological sample, and in the case the biological sample is to be aspirated first by the first aspiration unit and second by the second aspiration from the same sample container in this order, the controller controls the ultrasonic cleaner to propagate the ultrasonic vibration to the outer surface of the first aspiration probe before the first aspiration unit aspirates the biological sample.

Embodiment 21: The in-vitro diagnostic system according to embodiment 20,
wherein a priority aspiration flag for the immune inspection item can be set as analysis condition of the immune inspection item by the setting unit,
wherein in a case an immune inspection item, for which the priority aspiration flag is ON and for which it is not selected that the ultrasonic vibrator propagates the ultrasonic vibration, and a colorimetric inspection item are requested for the same biological sample, the controller controls the sample transfer unit such that the biological sample is transferred first to the second aspiration unit and second to the first aspiration unit in this order.

SHORT DESCRIPTION OF THE FIGURES

Further features and embodiments of the invention will be disclosed in more detail in the subsequent description, particularly in conjunction with the dependent claims. Therein the respective features may be realized in an isolated fashion as well as in any arbitrary feasible combination, as a skilled person will realize. The embodiments are schematically depicted in the figures. Therein, identical reference numbers in these figures refer to identical elements or functionally identical elements.

In the figures.

DETAILED DESCRIPTION

Figure 1:
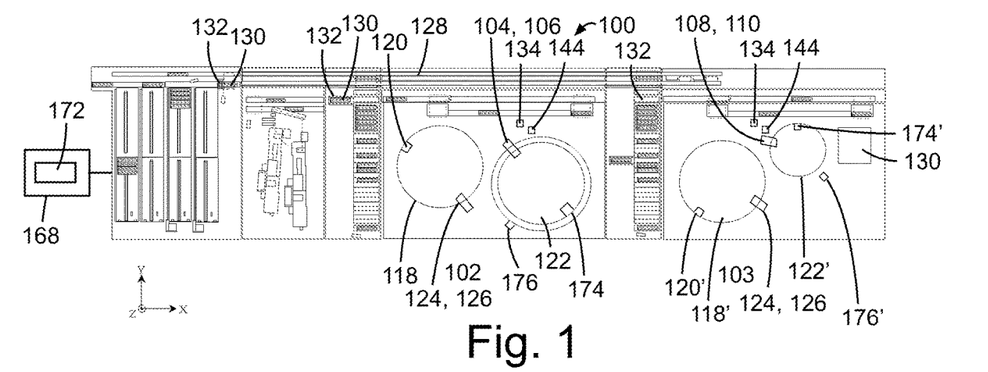
FIG. 1 shows view illustrating a configuration of an in-vitro diagnostic system.
Figure 2A:
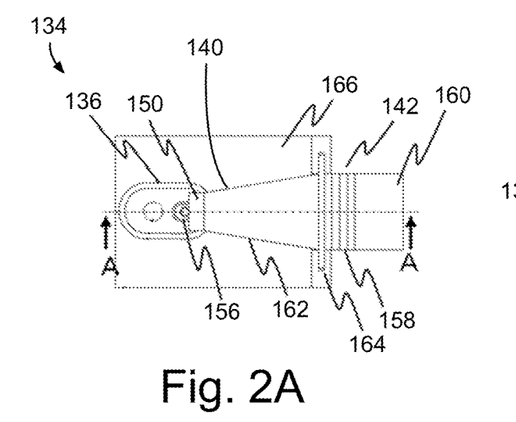
FIG. 2A is a top, plan view of an embodiment of the first probe wash station.
Figure 2B:
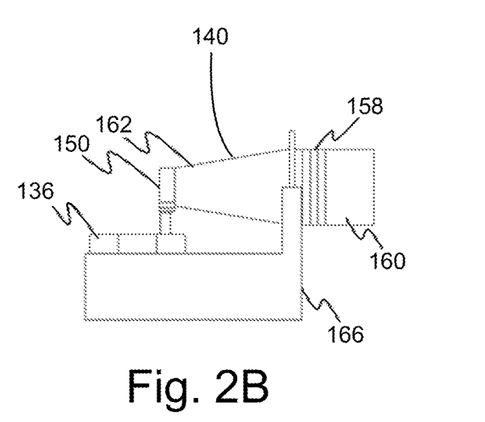
FIG. 2B is a side, elevational view of the first probe wash station of FIG. 2A.
Figure 2C:
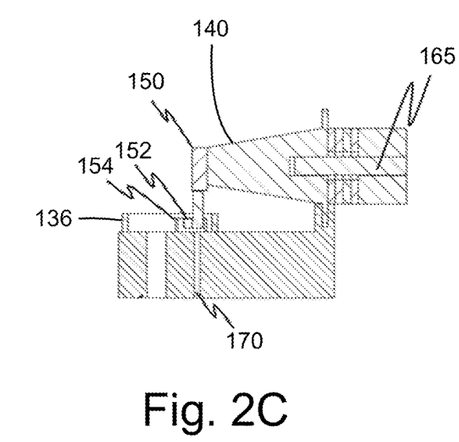
FIG. 2C is a perspective view of the first probe wash station of FIG. 2A.
Figure 2D:
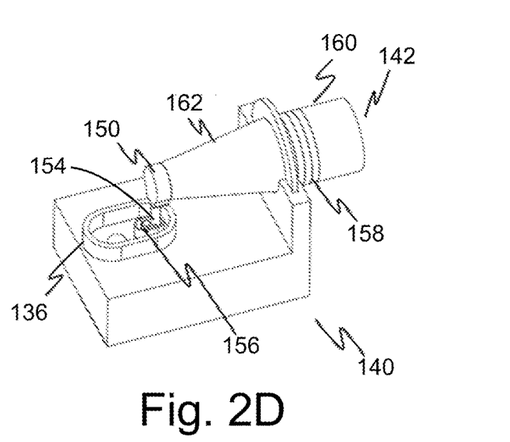
FIG. 2D is a cross-sectional view of the first probe wash station of FIG. 2A.

FIG. 1 is a view illustrating a configuration of an in-vitro diagnostic system 100. The in-vitro diagnostic system 100 comprises at least one automatic analyzer and in this case two automatic analyzers 102, 103 configured to analyze biological samples. For example, the first automatic analyzer 102 is a clinical chemistry analyzer and the second automatic analyzer 103 is an immunochemistry analyzer. The system 100 may however comprise at least one of or a combination of any two or more of an immunochemistry analyzer, a clinical chemistry analyzer, a nucleic acid analyzer, a coagulation analyzer, a hematology analyzer, a mass spectrometric analyzer. The first automatic analyzer 102 comprises a first aspiration unit 104 comprising a first aspiration probe 106 and the second automatic analyzer 103 comprises a second aspiration unit 108 comprising a second aspiration probe 110. According to an embodiment, the first aspiration probe 106 is a reusable probe and the second aspiration probe 110 is also a reusable probe. According to an embodiment, the first aspiration probe 106 is a reusable probe and the second aspiration probe 110 is a disposable tip. The first aspiration probe 106 is hollow and, thus, comprises an outer surface 112 and an inner surface 114 (FIG. 3C) forming an inner space 116 for receiving a fluid. According to an embodiment the second aspiration probe 110 has the same or similar structure of the first aspiration probe 106 if the second aspiration probe 110 is a reusable probe. According to an embodiment the first automatic analyzer 102 and the second automatic analyzer 103 share the same aspiration unit 104.

The first automatic analyzer 102 further comprises a reagent disk 118 on which a plurality of reagent containers 120 is disposed and a reaction disk 122 comprising reaction containers 174 configured to accommodate mixtures of reagents and samples. The first automatic analyzer 102 further comprises a reagent dispensing mechanism 124 configured to aspirate a reagent from a reagent container 120 and dispense the reagent into a reaction container 174. For this reason, the reagent dispensing mechanism 124 is provided with a reagent nozzle 126 for dispensing the reagent. The first aspiration unit 104 is configured to aspirate and dispense a biological sample into a reaction container 174 by the first aspiration probe 106. The second automatic analyzer 103 has a similar design as the first automatic analyzer 102, comprising a reagent disk 118' on which a plurality of reagent containers 120' is disposed, a reagent dispensing mechanism 124' provided with a reagent nozzle 126' and a reaction disk 122' comprising reaction containers 174' configured to accommodate mixtures of reagents and samples, and where the second aspiration unit 108 is configured to aspirate and dispense a biological sample by the second aspiration probe 110. The second automatic analyzer 103 further comprises a disposable tip supply section 190 to supply a disposable tip to the second aspiration probe 110 in case that the second aspiration probe 110 is a disposable tip. The second automatic analyzer 103 further comprises a first probe wash station 134 and a second probe wash station 144 which can be identical to that of the first automatic analyzer 102. According to an embodiment the first aspiration unit 104 and the second aspiration unit 108 share the same first probe wash station 134 and second probe wash station 144. Moreover, the first probe wash station 134 and second probe wash station 144 may also be combined into one probe wash station where rinsing with the second wash fluid is carried out at the same wash station after replacing the first wash fluid with the second wash fluid. Also, as already mentioned, the first automatic analyzer 102 and the second automatic analyzer 103 may share the same aspiration unit 104.

Figure 9:
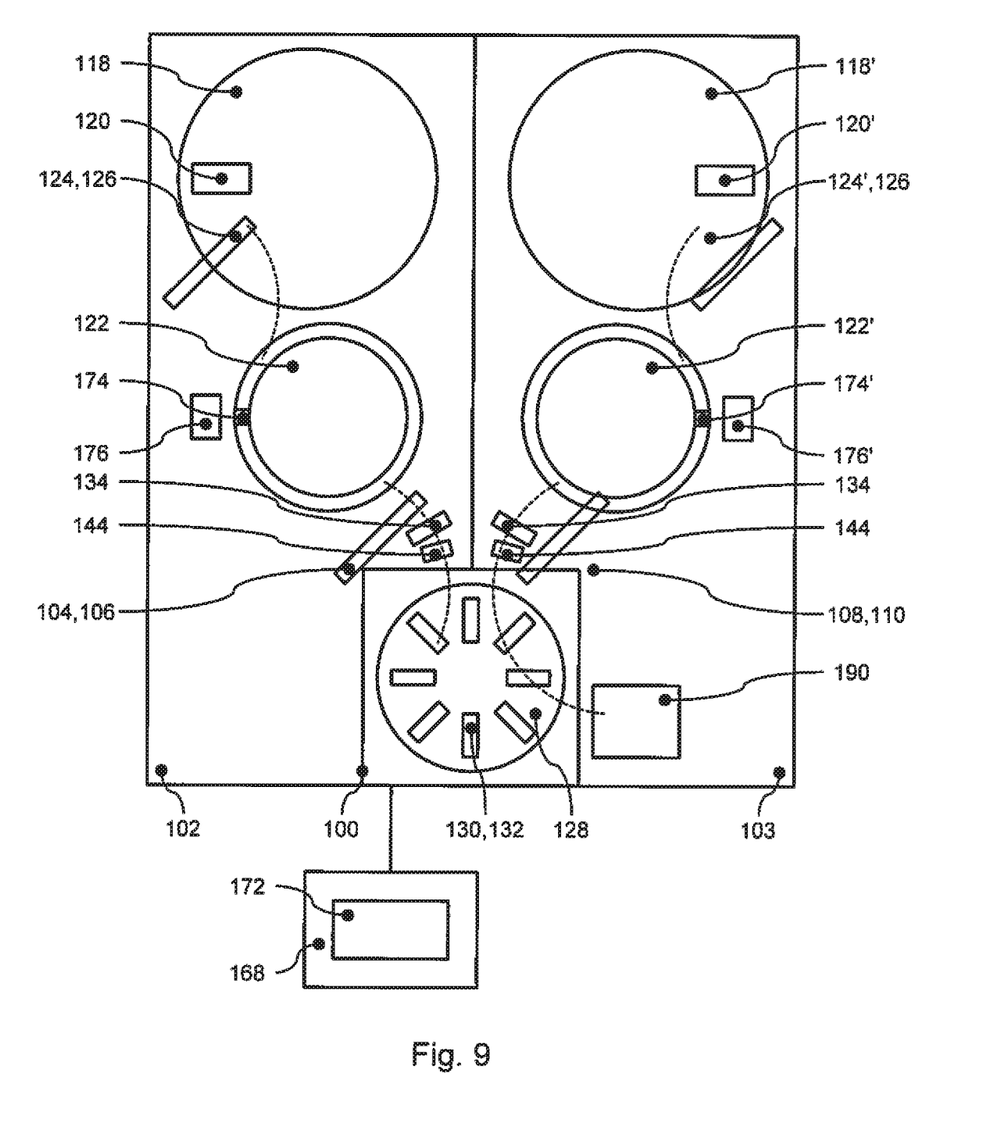
FIG. 9 shows view illustrating a configuration of another diagnostic system.

The in-vitro diagnostic system 100 further comprises a sample transfer unit 128 for transferring a plurality of sample containers 130 to the first and second aspiration units 104, 108. The sample put into the sample transfer unit 128 is loaded on a rack 132 and is transported in a state of being in a sample container 130 such as test tube. The plurality of sample containers 130 are loaded on the rack 132. The sample may be a sample from blood, such as serum, plasma or whole blood, or urine, for example. In this embodiment, the sample transfer unit 128 is configured to linearly transport the sample containers 130 and the racks 132 to the first and second aspiration units 104, 108. Alternatively, the sample transfer unit 128 may transport the sample containers 130 and the racks 132 to the first and second aspiration units 104, 108 by rotation. According to an embodiment, the sample transfer unit can be a disk configured to accommodate a plurality of sample racks or sample containers, where the disk is configured to transport a sample rack or a sample container at a time to the first and second aspiration units 104, 108 respectively like an in-vitro diagnostic system in FIG. 9. FIG. 9 shows the first and second aspiration units 104,108. All other features that are otherwise to be found also in FIG. 1 in a different arrangement are given like reference numbers. However, according to an embodiment, one common aspiration unit for reaction disks 122, 122' can be comprised in the system instead of the aspiration units 104, 108. In such case, the common aspiration unit comprises one common aspiration probe instead of the first and second aspiration probes 106, 110.

The first probe wash station 134, shown in more detail in FIG. 2, comprises a first wash chamber 136 holding a first wash fluid 138 and an ultrasonic cleaner 140 comprising an ultrasonic vibrator 142 configured to propagate an ultrasonic vibration to the outer surface 112 of the first aspiration probe 106 via the first wash fluid 138. With combined reference to FIG. 3A to 6H, the in-vitro diagnostic system 100 further comprises at least one second probe wash station 144 comprising a second wash chamber 146 for rinsing the first aspiration probe 106 with a second wash fluid 148. The first wash fluid 138 is a chemically aggressive fluid. Particularly, the first wash fluid 138 is an alkaline solution such as a sodium hydroxide solution, e.g. 1 mol/l comprising 4% detergent. The second wash fluid 148 is water. In addition, the automatic analyzer 103 does not need to comprise the first and second probe wash stations if the second aspiration probe 110 equipped on the second aspiration unit 108 in the automatic analyzer 103 is a disposable tip, and the automatic analyzer 103 does not need to comprise the disposable tip supply section 190 if the second aspiration probe 110 equipped on the second aspiration unit 108 in the automatic analyzer 103 is a reusable probe.

FIG. 2 is an appearance view of an example of the ultrasonic cleaner 140. The ultrasonic cleaner 140 uses an ultrasonic vibrator 142. The ultrasonic vibrator 142 comprises a cleaning head 150. The cleaning head 150 comprises a longitudinal body 152 and a tip 154 protruding from the longitudinal body 152 that is insertable into the first wash chamber 136 and into the first wash fluid 138. The tip 154 comprises a through hole 156 having a diameter greater than the diameter of the first aspiration probe 106 that is fillable with the first wash fluid 138 when the tip 154 is inserted in the first wash chamber 136 and into which at least part of the first aspiration probe 106 can be inserted. The ultrasonic vibrator 142 further comprises one or more piezoelectric elements 158 fixed between at least a rear or back mass 160 and a front mass 162 connected to the cleaning head 150 for generating the ultrasonic vibration and propagating the ultrasonic vibration through the cleaning head 150 to the first wash fluid 138 in the hole 156 of the tip 154 and through the first wash fluid 138 to the first aspiration probe 106 inserted into the hole 156. The ultrasonic vibration of the tip 154 in the first wash fluid causes cavitation in and around the hole 156 of the tip 154 and the outside surface of the first aspiration probe 106 is cleaned by the cavitation. Further, a metal member 164 is arranged between the one or more piezoelectric elements 158 and the front mass 162. The front mass 162 has in this case a tapered shape that may have the advantageous effect of converging the ultrasonic wave. For example, the diameter of the front mass 162 may decrease from the piezoelectric element side towards the tip side. The back mass 160 and the front mass 162 may be metal blocks. Particularly, the one or more piezoelectric elements 158 and the metal member 164 are interposed between the back mass 160 and the front mass 162, and are fastened and fixed by a bolt 165 in the ultrasonic vibrator 142. The metal member 164 can be fixed to an ultrasonic vibrator base 166. The cleaning head 150, which serves as a vibrating part, is fixed to the ultrasonic vibrator 142 by a bolt or the like.

The in-vitro diagnostic system 100 further comprises a controller 168 configured to control the ultrasonic cleaner 140 and the first and second aspiration units 104, 108. More particularly, the controller 168 is configured to drive the ultrasonic vibrator 142, and to control that vibration frequency and/or temperature of the first wash fluid 138 in the first wash chamber 136 remain within predefined ranges. In a state where the first aspiration probe 106 is inserted into the first wash chamber 136 and approaches the cleaning head 150, the tip end of the first aspiration probe 106 can be cleaned as will be explained in further detail below.

The ultrasonic cleaner 140 is fixed to the ultrasonic vibrator base 166, which is made of metal, via the metal member 164 at a part at which the vibration amplitude of the ultrasonic vibrator 142 does not become large (a node of the vibration). The metal member 164 is adjacent to the one or more piezoelectric elements 158 being a heat generation source, and the heat when driving the ultrasonic vibrator 142 moves to the metal member 164 from the one or more piezoelectric elements 158. After this, the heat moves in order of the front mass 162 and the cleaning head 150, and when the cleaning head 150 is heated, the first aspiration probe 106 is warmed via the first wash fluid 138 when cleaning the first aspiration probe 106. However, a heat capacity increases since the plate thickness in the metal member 164 can be rather thick (the volume increases), and the movement of the heat to the cleaning head 150 can decrease. Therefore, by providing the metal member 164 and the ultrasonic vibrator base 166, it is possible to effectively radiate the heat, and to suppress the movement of the heat to the cleaning head 150.

In particular, in order to improve the heat radiation properties, it is desirable that the material of the metal member 164 and the ultrasonic vibrator base 166 is a material having higher thermal conductivity than that of the front mass 162 or the cleaning head 150, and by radiating the heat from the metal member 164 or by integrally moving the heat to the ultrasonic vibrator base 166, the heat from the one or more piezoelectric elements 158 is unlikely to be moved to the cleaning head 150.

Furthermore, for increasing the heat radiation efficiency from the metal member 164, there is a method of providing a fin structure in the metal member 164 or the ultrasonic vibrator base 166, increasing the surface area, and sticking a heat sink to the metal member 164. In addition, in the structure of the ultrasonic cleaner 140, it is possible to cool the metal member 164 by cooling the ultrasonic vibrator base 166, and to suppress the movement of the heat to the cleaning head 150. For cooling, there is a method of attaching a fan for air cooling or a water cooling tube to the ultrasonic vibrator base 166, and a method of attaching a Peltier element.

As described above, the cleaning head 150 is used by disposing the tip 154 in the first wash chamber 136. By providing the through hole 156 to surround the first aspiration probe 106 in the tip 154 of the cleaning head 150, it is possible to effectively clean the entire circumference of the first aspiration probe 106.

The first probe wash station 134 further comprises a supply section 170 to supply the first wash fluid 138 to wash the first aspiration probe 106. The controller 168 is configured to determine which of the first and second aspiration units 104, 108 aspirates the biological sample first. In case it is determined by the controller 168 that the biological sample in the same sample container 130 is to be aspirated first by the first aspiration unit 104 and second by the second aspiration unit 108 in this order, the controller 168 is configured to control the ultrasonic cleaner 140 to propagate the ultrasonic vibration to the outer surface 112 of the first aspiration probe 106 before the first aspiration unit 104 aspirates the biological sample.

The in-vitro diagnostic system 100 may be configured such that the first aspiration unit 104 dispenses the biological sample into one of first reaction containers of a first group and the second aspiration unit 108 dispenses the biological sample into one of second reaction containers of a second group which is different from the first group. For example, the first reaction containers are used for colorimetric inspection items and the second reaction containers are used for immune inspection items.

For this reason, the in-vitro diagnostic system 100 may further comprise a setting unit 172 for setting wash conditions of the first aspiration probe 106 corresponding to an immune inspection item and for selecting whether the ultrasonic vibrator 142 propagates the ultrasonic vibration to the outer surface 112 of the first aspiration probe 106 or not as one of the wash conditions. In a case of an immune inspection item, for which it is selected that the ultrasonic vibrator 142 propagates the ultrasonic vibration, and a colorimetric inspection item are requested for the same biological sample, and in the case the biological sample is to be aspirated first by the first aspiration unit 104 and second by the second aspiration unit 108 from the same sample container 130 in this order, the controller 168 is configured to control the ultrasonic cleaner 140 to propagate the ultrasonic vibration to the outer surface 112 of the first aspiration probe 106 before the first aspiration unit 104 aspirates the biological sample. Further, a priority aspiration flag for the immune inspection item can be set as analysis condition of the immune inspection item by the setting unit 172. In a case of an immune inspection item, for which the priority aspiration flag is ON and for which it is not selected that the ultrasonic vibrator 142 propagates the ultrasonic vibration, and a colorimetric inspection item are requested for the same biological sample, the controller 168 is configured to control the sample transfer unit 128 such that the biological sample is transferred first to the second aspiration unit 108 and second to the first aspiration unit 104 in this order. The setting unit 172 may be part of the controller 168 or connected therewith.

The first aspiration unit 104 is configured to move the first aspiration probe 106 to an aspiration position at which the sample is aspirated from the sample container 130, a dispensing position at which the sample is dispensed to a reaction container 174, a first cleaning position at which a tip end of the first aspiration probe 106 is cleaned at the first probe wash station 134 by the ultrasonic cleaner 140, and a second cleaning position at which the tip end of the first aspiration probe 106 is cleaned at the second probe wash station 144 with the second wash fluid 148. Furthermore, the first aspiration unit 104 lowers the first aspiration probe 106 in accordance with each height of the sample container 130, the reaction container 174, the ultrasonic cleaner 140, and the second probe wash station 144 at the aspiration position, the dispensing position, and the first and second cleaning positions. In order to perform such an operation, the first aspiration unit 104 is configured to rotate the first aspiration probe 106 at each stop position, and to be vertically movable.

The first automatic analyzer 102 further has a measuring portion 176, and is configured to perform at least one of or a combination of any two or more of an immunochemical test, a clinical chemical test, a nucleic acid test, a coagulation test, a hematology test, a mass spectrometric test. For example, the measuring portion 176 analyzes a concentration of a predetermined component in the sample by performing photometry with respect to the mixture of the sample and the reagent accommodated in the reaction container 174. The measuring portion 176 has, for example, a light source and a photometer, and the photometer is, for example, a light-absorption photometer or a light-scattering photometer. According to another embodiment the measuring portion 176 is configured to detect light from a luminescent label in the mixture of sample and the reagent accommodated in a reaction container 174. In addition, movement of the first aspiration probe 106 or aspiration/dispensing control of the sample, control of fluid supply to the second probe wash station 144, driving control of the ultrasonic cleaner 140, and control of other various types of mechanisms, are performed by the controller 168. The second automatic analyzer 103 further has a measuring portion 176' that may be also configured to perform at least one of or a combination of any two or more of an immunochemical test, a clinical chemical test, a nucleic acid test, a coagulation test, a hematology test, a mass spectrometric test.

Next, an example for an analyzing operation of the automatic analyzer 102 will be described. The rack 132 in which the sample container 130 is accommodated moves to the aspiration position of the sample. At this position, the sample is aspirated by the first aspiration probe 106 from the sample container 130. The aspirated sample is dispensed to the reaction container 174. The reagent disk 118 moves the desired reagent container 120 to a position at which the reagent nozzle 126 can access the reagent container 120 being rotated. At this position, the reagent is aspirated by the reagent nozzle 126 from the reagent container 120. The aspirated reagent is dispensed to the reaction container 174. The mixture of the sample and the reagent which are accommodated in the same reaction container 174 are agitated, and the reaction disk 122 proceeds the reaction of the sample and the reagent while repeating the rotation and stop.

The reaction disk 122 is driven while repeating the rotation and stop, and the reaction container 174 which is a target to be measured periodically passes through the front of the measuring portion 176. When passing, the light irradiated from the light source is transmitted through the mixture in the reaction container 174, and absorbance and/or scattering are measured by the photometer. From the information of the light obtained by the photometer, the concentration of a predetermined component, which corresponds to the type of the reagent in the sample, is calculated. Analogously, the second aspiration unit 108 and the second aspiration probe 110 may be operated.

Hereinafter, a method of washing an aspiration probe 106 of an in-vitro diagnostic system 100 will be described. The method will be described with reference to the in-vitro diagnostic system 100 and the first aspiration probe 106 described before. Basically, the method comprises dipping the first aspiration probe 106 into the first wash fluid 138 so that the outer surface 112 is immersed at least in part into the first wash fluid 138, aspirating an amount of the first wash fluid 138 into the inner space 116 of the first aspiration probe 106, propagating an ultrasonic vibration to the outer surface 112 of the first aspiration probe 106 via the first wash fluid 138, and rinsing the outer surface 112 and the inner surface 114 of the first aspiration probe 106 with the second wash fluid 148. Any one or more of these individual steps may be repeated.

Hereinafter, the method of washing an aspiration probe 106 of an in-vitro diagnostic system 100 will be described in further detail.

Figure 3A:
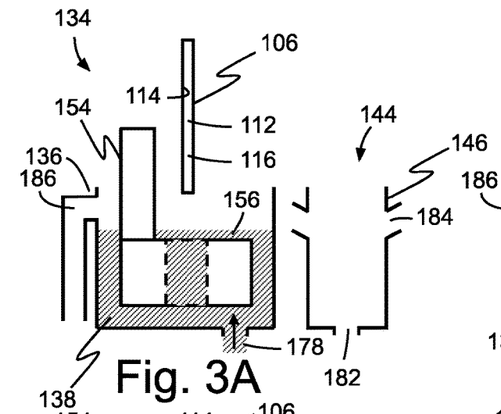
FIG. 3A-3F show steps of an example for a method for washing an aspiration probe.

FIGS. 3A-3F show an example of the respective steps of the washing process. In FIGS. 3A-3F, the first probe wash station 134 comprising the first wash chamber 136 holding the first wash fluid 138 and the ultrasonic cleaner 140 are shown at the left. Further, in FIGS. 3A-3F, the second probe wash station 144 comprising the second wash chamber 146 is shown at the right. As shown in FIG. 3A, the first wash chamber 136 is supplied with the first wash fluid 138 through an inlet 178. In addition, the through hole 156 of the tip 154 of the cleaning head 150 of the ultrasonic cleaner 140 is filled with the first wash fluid by the supply section comprising an inlet 178.

Figure 3B:
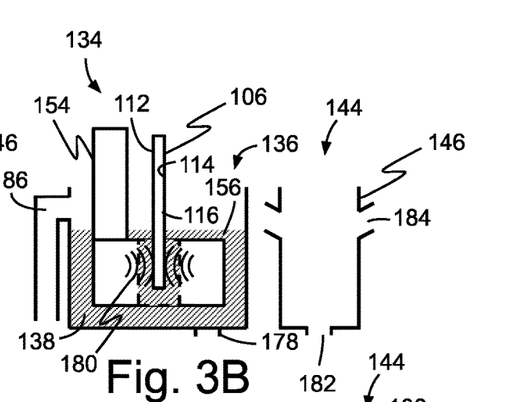

As shown in FIG. 3B, the first aspiration probe 106 is dipped into the first wash fluid 138 by the first aspiration unit 104 into the through hole 156 of the tip 154 so that the outer surface 112 is immersed at least in part into the first wash fluid 138. Thereby, ultrasonic vibration 180 propagates to the outer surface 112 of the first aspiration probe 106 via the first wash fluid 138.

Figure 3C:
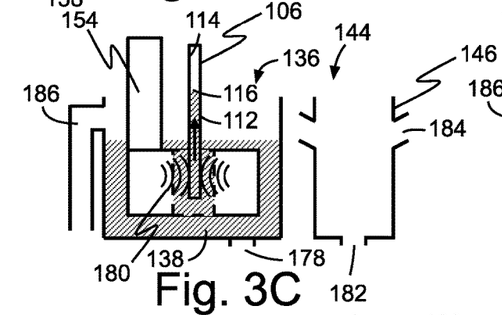

As shown in FIG. 3C, an amount of the first wash fluid 138 is aspirated into the inner space 116 of the first aspiration probe 106 while the ultrasonic vibration is propagated. After a certain time, the ultrasonic cleaner 140 and the ultrasonic vibrator 142, respectively, are stopped.

Figure 3D:
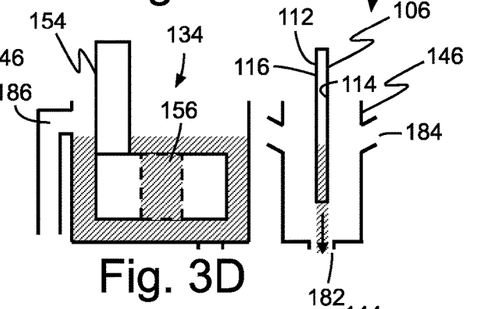

As shown in FIG. 3D, the first aspiration probe 106 is moved from the first probe wash station 134 to the second probe wash station 144 where the first aspiration probe 106 dispenses or dispenses the amount of the first wash fluid 138 aspirated into the inner space 116 of the first aspiration probe 106. The amount of the first wash fluid 138 is also discharged from the second wash chamber 146 through an outlet 182.

Figure 3E:
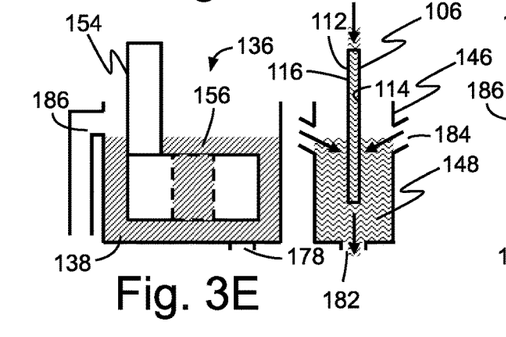

As shown in FIG. 3E, the outer surface 112 and the inner surface 114 of the first aspiration probe 106 are rinsed with the second wash fluid 148 which is supplied through an inlet 184 and the inner space 116. The second wash fluid 148 may be supplied to the inner space 116 from an end of the first aspiration probe opposite to the tip thereof.

Figure 3F:
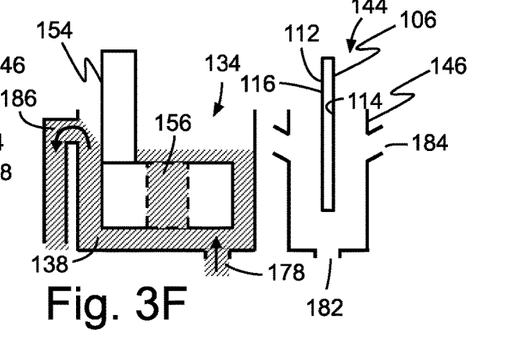

As shown in FIG. 3F, the second wash fluid 148 is discharged from the second wash chamber 146 through the outlet 182. Further, the first wash fluid 138 is discharged from the first wash chamber 136 through an outlet 186. The first wash chamber 136 can be re-filled with fresh first wash fluid 138 through the inlet 178.

Figure 4A:
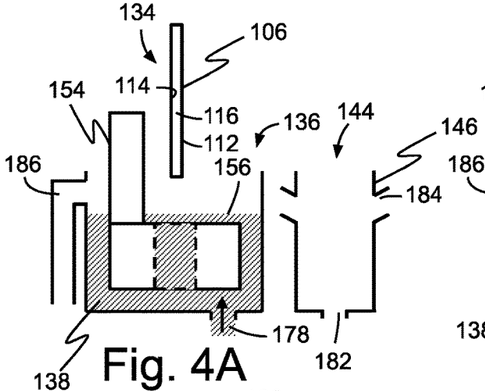
FIG. 4A-4G show steps of a further example for a method for washing an aspiration probe.

FIGS. 4A-4G show a further example of the respective steps of the washing process. Hereinafter, differences from the example shown in FIGS. 3A-3F will be described and like constructional members are indicated by like reference numerals. In FIGS. 4A-4G, the first probe wash station 134 comprising the first wash chamber 136 holding the first wash fluid 138 and the ultrasonic cleaner 140 are shown at the left. Further, in FIGS. 4A-4G, the second probe wash station 144 comprising the second wash chamber 146 is shown at the right. As shown in FIG. 4A, the first wash chamber 136 is supplied with the first wash fluid 138 through the inlet 178. In addition, the through hole 156 of the tip 154 of the cleaning head 150 of the ultrasonic cleaner 140 is filled with the first wash fluid.

Figure 4B:
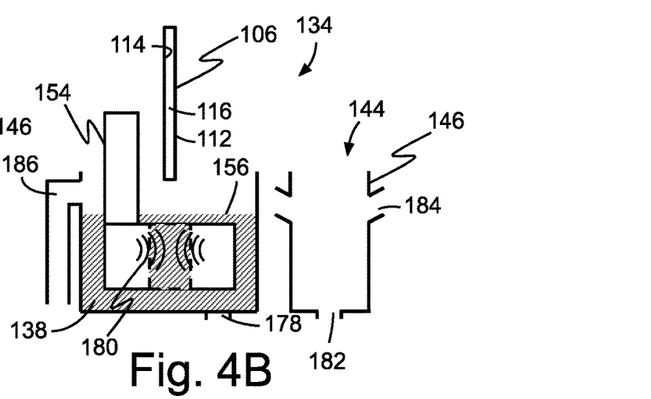

As shown in FIG. 4B, the ultrasonic vibration is propagated before the first aspiration probe 106 is dipped into the first wash fluid 138.

Figure 4C:
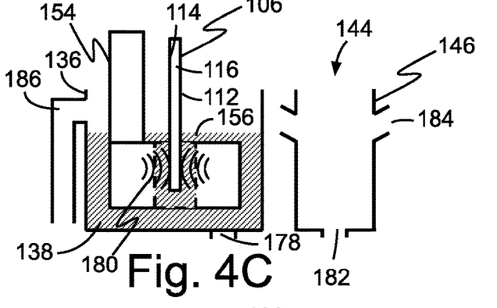

As shown in FIG. 4C, the first aspiration probe 106 is dipped into the through hole 156 of the tip 154 into the first wash fluid 138 by the first aspiration unit 104 so that the outer surface 112 is immersed at least in part into the first wash fluid 138 while the ultrasonic vibration 180 propagates to the outer surface 112 of the first aspiration probe 106 via the first wash fluid 138.

Figure 4D:
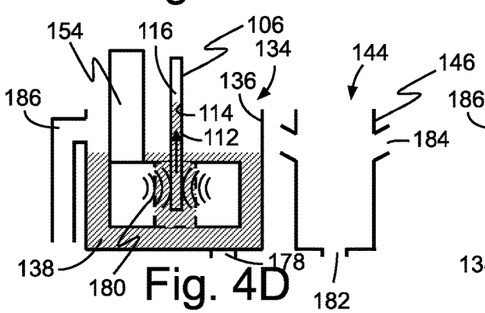

As shown in FIG. 4D, an amount of the first wash fluid 138 is aspirated into the inner space 116 of the first aspiration probe 106 while the ultrasonic vibration is propagated. Aspiration of the first wash fluid 138 may actually advantageously start while dipping the aspiration probe 106 into the first wash fluid 138 and as soon the tip of the aspiration probe 106 is below the surface of the first wash fluid 138. After a certain time, the ultrasonic cleaner 140 and the ultrasonic vibrator 142, respectively, are stopped.

Figure 4E:
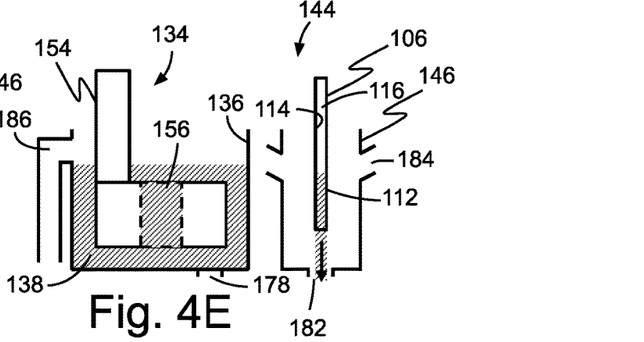

As shown in FIG. 4E, the first aspiration probe 106 is moved from the first probe wash station 134 to the second probe wash station 144 where the first aspiration probe 106 dispenses or dispenses the amount of the first wash fluid 138 aspirated into the inner space 116 of the first aspiration probe 106. The amount of the first wash fluid 138 is also discharged from the second wash chamber 146 through the outlet 182.

Figure 4F:
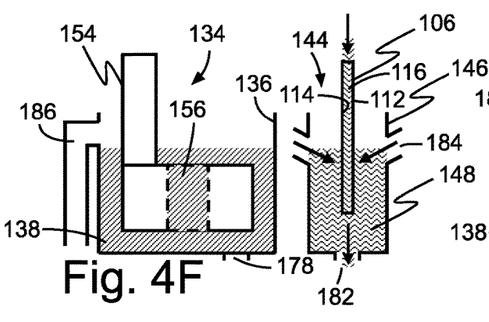

As shown in FIG. 4F, the outer surface 112 and the inner surface 114 of the first aspiration probe 106 are rinsed with the second wash fluid 148 which is supplied through the inlet 184 and the inner space 116. The second wash fluid 148 may be supplied to the inner space 116 from an end of the first aspiration probe opposite to the tip thereof.

Figure 4G:
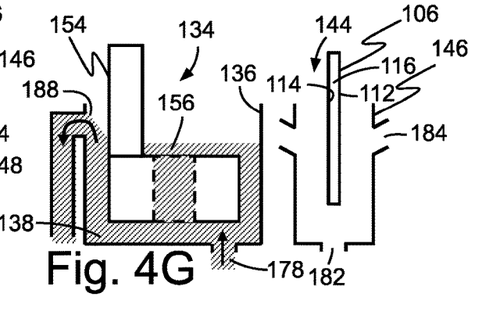

As shown in FIG. 4G, the second wash fluid 148 is discharged from the second wash chamber 146 through the outlet 182. Further, the first wash fluid 138 is discharged from the first wash chamber 136 through the outlet 186. The first wash chamber 136 can be re-filled with fresh first wash fluid 138 through the inlet 178.

Figure 5A:
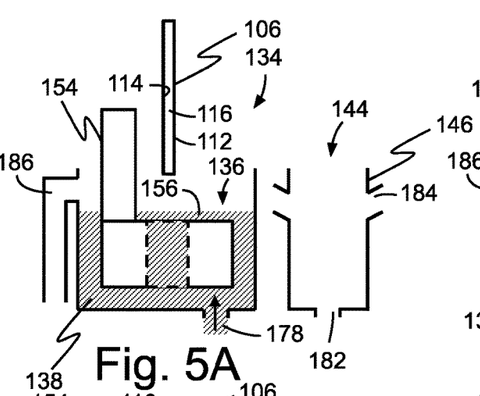
FIG. 5A-5F show steps of a further example for a method for washing an aspiration probe.

FIGS. 5A-5F show a further example of the respective steps of the washing process. Hereinafter, differences from the example shown in FIGS. 3A-3F will be described and like constructional members are indicated by like reference numerals. In FIGS. 5A-5F, the first probe wash station 134 comprising the first wash chamber 136 holding the first wash fluid 138 and the ultrasonic cleaner 140 are shown at the left. Further, in FIGS. 5A-5F, the second probe wash station 144 comprising the second wash chamber 146 is shown at the right. As shown in FIG. 5A, the first wash chamber 136 is supplied with the first wash fluid 138 through the inlet 178. In addition, the through hole 156 of the tip 154 of the cleaning head 150 of the ultrasonic cleaner 140 is filled with the first wash fluid. The first aspiration probe 106 is dipped into the through hole 156 of the tip 154 into the first wash fluid 138 by the first aspiration unit 104 so that the outer surface 112 is immersed at least in part into the first wash fluid 138.

Figure 5B:
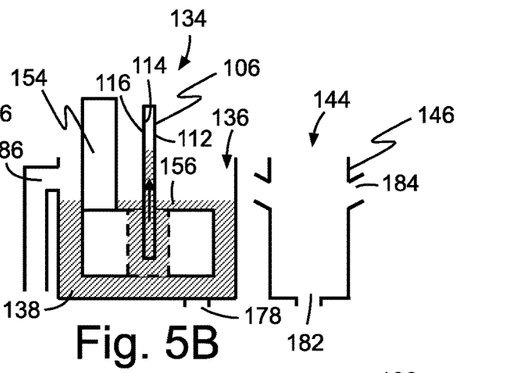

As shown in FIG. 5B, an amount of the first wash fluid 138 is aspirated into the inner space 116 of the first aspiration probe 106 before the ultrasonic vibration is propagated.

Figure 5C:
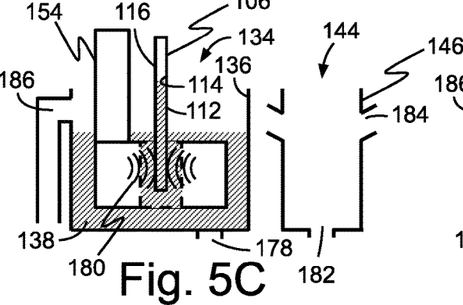

As shown in FIG. 5C, the ultrasonic vibration 180 propagates then to the outer surface 112 of the first aspiration probe 106 via the first wash fluid 138. After a certain time, the ultrasonic cleaner 140 and the ultrasonic vibrator 142, respectively, are stopped.

Figure 5D:
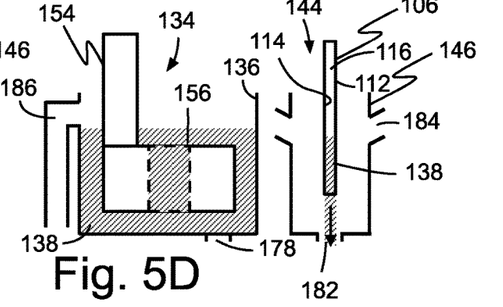

As shown in FIG. 5D, the first aspiration probe 106 is moved from the first probe wash station 134 to the second probe wash station 144 where the first aspiration probe 106 dispenses the amount of the first wash fluid 138 aspirated into the inner space 116 of the first aspiration probe 106. The amount of the first wash fluid 138 is also discharged from the second wash chamber 146 through the outlet 182.

Figure 5E:
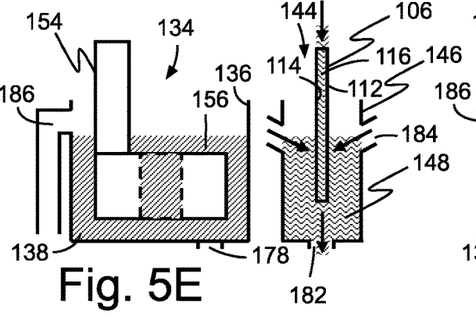

As shown in FIG. 5E, the outer surface 112 and the inner surface 114 of the first aspiration probe 106 are rinsed with the second wash fluid 148 which is supplied through the inlet 184 and the inner space 116. The second wash fluid 148 may be supplied to the inner space 116 from an end of the first aspiration probe opposite to the tip thereof.

Figure 5F:
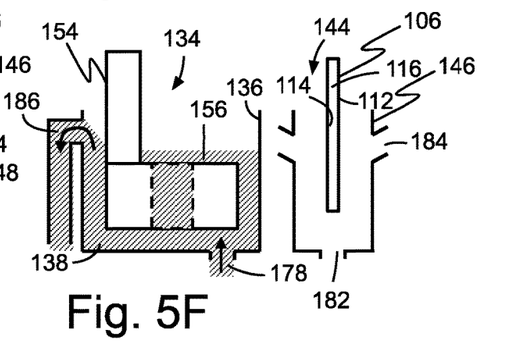

As shown in FIG. 5F, the second wash fluid 148 is discharged from the second wash chamber 146 through the outlet 182. Further, the first wash fluid 138 is discharged from the first wash chamber 136 through the outlet 186. The first wash chamber 136 can be re-filled with fresh first wash fluid 138 through the inlet 178.

Figure 6A:
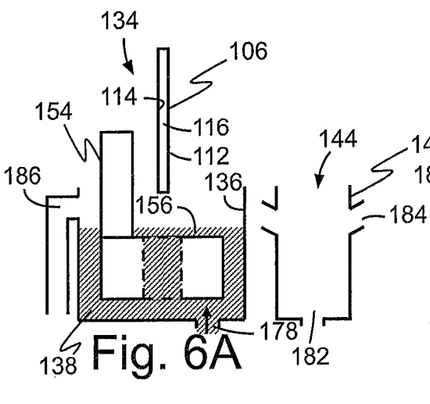
FIG. 6A-6H show steps of a further example for a method for washing an aspiration probe.

FIGS. 6A-6H show a further example of the respective steps of the washing process. Hereinafter, differences from the example shown in FIGS. 3A-3F will be described and like constructional members are indicated by like reference numerals. In FIGS. 6A-6H, the first probe wash station 134 comprising the first wash chamber 136 holding the first wash fluid 138 and the ultrasonic cleaner 140 are shown at the left. Further, in FIGS. 6A-6H, the second probe wash station 144 comprising the second wash chamber 146 is shown at the right. As shown in FIG. 6A, the first wash chamber 136 is supplied with the first wash fluid 138 through the inlet 178. In addition, the through hole 156 of the tip 154 of the cleaning head 150 of the ultrasonic cleaner 140 is filled with the first wash fluid.

Figure 6B:
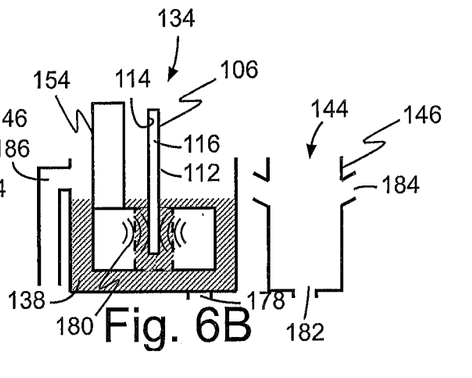

As shown in FIG. 6B, the first aspiration probe 106 is dipped into the through hole 156 of the tip 154 into the first wash fluid 138 by the first aspiration unit 104 so that the outer surface 112 is immersed at least in part into the first wash fluid 138. Then, ultrasonic vibration 180 propagates to the outer surface 112 of the first aspiration probe 106 via the first wash fluid 138. Alternatively, ultrasonic vibration can be started also in advance, before the first aspiration probe 106 is dipped into the first wash fluid 138.

Figure 6C:
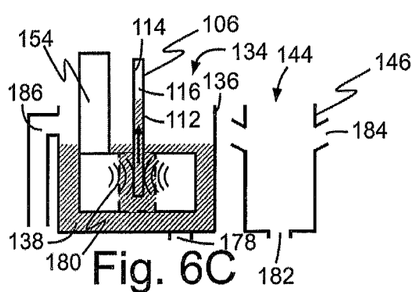

As shown in FIG. 6C, an amount of the first wash fluid 138 is aspirated into the inner space 116 of the first aspiration probe 106 while the ultrasonic vibration 180 propagates to the outer surface 112 of the first aspiration probe 106 via the first wash fluid 138. Aspiration of the first wash fluid 138 may advantageously start while dipping the aspiration probe 106 into the first wash fluid 138 and as soon the tip of the aspiration probe 106 is below the surface of the first wash fluid 138.

Figure 6D:
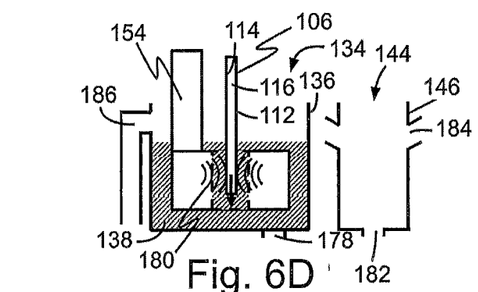

As shown in FIG. 6D, the amount of the first wash fluid 138 is discharged from the inner space 116 of the first aspiration probe 106 while the ultrasonic vibration 180 is propagated. The steps shown in FIGS. 6C and 6D can be repeated n times, wherein n is an integer greater than 1.

Figure 6E:
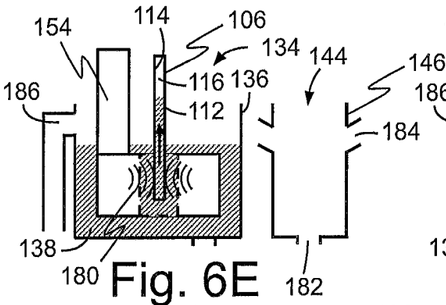

As shown in FIG. 6E, an amount of the first wash fluid 138 is aspirated into the inner space 116 of the first aspiration probe 106 while the ultrasonic vibration 180 is propagated. Thereby, ultrasonic vibration 180 propagates to the outer surface 112 of the first aspiration probe 106 via the first wash fluid 138. After a certain time, the ultrasonic cleaner 140 and the ultrasonic vibrator 142, respectively, are stopped.

Figure 6F:
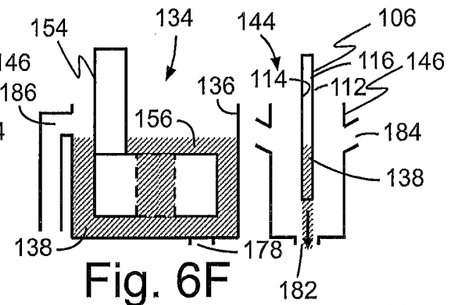

As shown in FIG. 6F, the first aspiration probe 106 is moved from the first probe wash station 134 to the second probe wash station 144 where the first aspiration probe 106 dispenses or dispenses the amount of the first wash fluid 138 aspirated into the inner space 116 of the first aspiration probe 106. The amount of the first wash fluid 138 is also discharged from the second wash chamber 146 through the outlet 182. The first wash chamber 136 can be re-filled with fresh first wash fluid 138.

Figure 6G:
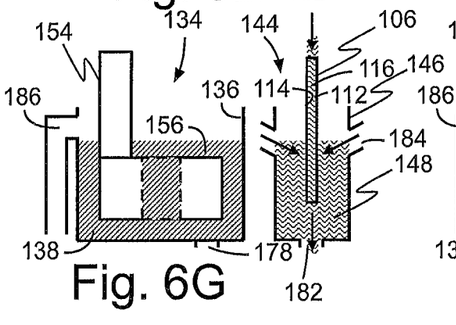

As shown in FIG. 6G, the outer surface 112 and the inner surface 114 of the first aspiration probe 106 are rinsed with the second wash fluid 148 which is supplied through the inlet 184 and the inner space 116. The second wash fluid 148 may be supplied to the inner space 116 from an end of the first aspiration probe opposite to the tip thereof.

Figure 6H:
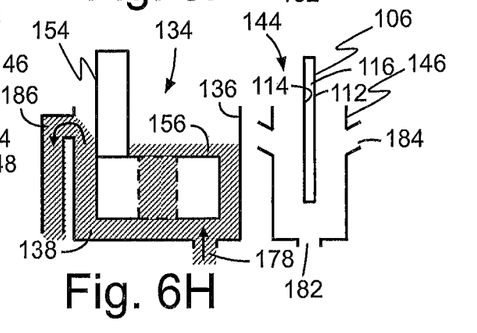

As shown in FIG. 6H, the second wash fluid 148 is discharged from the second wash chamber 146 through the outlet 182. Further, the first wash fluid 138 is discharged from the first wash chamber 136 through the outlet 186. The first wash chamber 136 can be re-filled with fresh first wash fluid 138 through the inlet 178.

Figure 7:
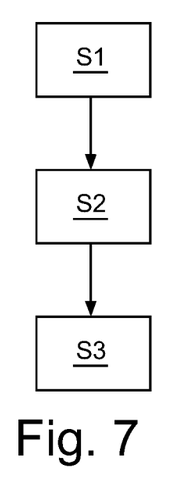
FIG. 7 shows an example for an in-vitro diagnostic method.

Next, an example for an in-vitro diagnostic method will be described with reference to FIG. 7. The in-vitro diagnostic method may be carried out by the in-vitro diagnostic system 100 described before. The in-vitro diagnostic method comprises sequentially aspirating different test fluids or different aliquots of a test fluid with a reusable aspiration probe in a step S1. The reusable aspiration probe may be the first aspiration probe 106. The method further comprises washing the first aspiration probe 106 according to any one of the examples for the method of washing an aspiration probe described with reference to FIGS. 3A-6H before and/or after aspirating a test fluid and/or at maintenance intervals in a step S2. The in-vitro diagnostic method may further comprise performing at least one of or a combination of any two or more of an immunochemical test, a clinical chemical test, a nucleic acid test, a coagulation test, a hematology test, a mass spectrometric test in a step S3.

Figure 8:
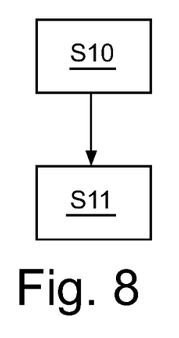
FIG. 8 shows a further example for an in-vitro diagnostic method.

Next, a further example for an in-vitro diagnostic method will be described with reference to FIG. 8. The in-vitro diagnostic method may be carried out by the in-vitro diagnostic system 100 described before. The in-vitro diagnostic method comprises performing a diagnostic test with lower susceptibility to carryover and a diagnostic test with higher susceptibility to carry-over comprising sequentially aspirating different respective test fluids with a reusable aspiration probe such as the first aspiration probe 106 in a step S10. The method further comprises washing the first aspiration probe 106 between diagnostic tests in a step S11, wherein washing the first aspiration probe 106 before performing the diagnostic test with higher susceptibility to carry over is performed according to any one of the examples for the method of washing an aspiration probe described with reference to FIGS. 3A-6H and washing the aspiration probe before performing the diagnostic test with lower susceptibility to carry over comprises only rinsing the outer surface 112 and the inner surface 114 of the first aspiration probe 106 with the second wash fluid 148. The diagnostic test with lower susceptibility to carryover may be a clinical chemical test and the diagnostic test with higher susceptibility to carryover may be an immunochemical test.

LIST OF REFERENCE NUMBERS 100 in-vitro diagnostic system
102 first automatic analyzer
103 second automatic analyzer
104 first aspiration unit
106 first aspiration probe
108 second aspiration unit
110 second aspiration probe
112 outer surface
114 inner surface
116 inner space
118 reagent disk of first automatic analyzer
118' reagent disk of second automatic analyzer
120 reagent container of first automatic analyzer
120' reagent container of second automatic analyzer
122 reaction disk of first automatic analyzer
122' reaction disk of second automatic analyzer
124 reagent dispensing mechanism of first automatic analyzer
124' reagent dispensing mechanism of second automatic analyzer
126 reagent nozzle of first automatic analyzer
126' reagent nozzle of second automatic analyzer
128 sample transfer unit
130 sample container
132 rack
134 first probe wash station
136 first wash chamber
138 first was fluid
140 ultrasonic cleaner
142 ultrasonic vibrator
144 second probe wash station
146 second wash chamber
148 second wash fluid
150 cleaning head
152 longitudinal body
154 tip
156 through hole
158 piezoelectric element
160 back mass
162 front mass
164 metal member
165 bolt
166 ultrasonic vibrator base
168 controller
172 setting unit
174 reaction container of first automatic analyzer
174' reaction container of second automatic analyzer
176 measuring portion of first automatic analyzer
176' measuring portion of second automatic analyzer
178 inlet
180 ultrasonic vibration
182 outlet
184 inlet
186 outlet
190 disposable tip supply section

The invention claimed is:

1. An in-vitro diagnostic method comprising performing a first diagnostic test and a second diagnostic test, the first diagnostic test having a higher susceptibility to carryover than the second diagnostic test, the method comprising:
providing a reusable aspiration probe comprising an outer surface and an inner surface forming an inner space for receiving a fluid,
providing a first probe wash station comprising a first wash chamber holding a first wash fluid and an ultrasonic cleaner comprising an ultrasonic vibrator configured to propagate an ultrasonic vibration to the outer surface of the aspiration probe via the first wash fluid,
sequentially aspirating different respective test fluids with the reusable aspiration probe,
washing the aspiration probe before performing the first diagnostic test and before performing the second diagnostic test, wherein washing the aspiration probe before performing the first diagnostic test comprises:
dipping the aspiration probe into a first wash fluid so that the outer surface is immersed at least in part into the first wash fluid,
aspirating an amount of the first wash fluid into the inner space of the aspiration probe,
propagating an ultrasonic vibration to the outer surface of the aspiration probe via the first wash fluid, while the first wash fluid is within the inner space of the aspiration probe,
expelling the first wash fluid from the inner space, and
rinsing the outer surface and the inner surface of the aspiration probe with a second wash fluid, wherein the first wash fluid is a different fluid from the second wash fluid, and
wherein washing the aspiration probe before performing the second diagnostic test with lower susceptibility to carry over comprises only rinsing the outer surface and the inner surface of the aspiration probe with the second wash fluid.

2. The method according to claim 1 comprising repeating any one or more of the individual steps.

3. The method according to claim 1 wherein the first wash fluid is a chemically aggressive fluid.

4. The method according to claim 3 wherein the first wash fluid is an alkaline solution.

5. The method according to claim 4 wherein the alkaline solution comprises a detergent.

6. The method according to claim 1 wherein the second wash fluid is water.

7. An in-vitro diagnostic method comprising sequentially aspirating different test fluids or different aliquots of a test fluid with a reusable aspiration probe, wherein the method comprises washing the aspiration probe according to claim 1 before and/or after aspirating a test fluid and/or at maintenance intervals.

8. The in-vitro diagnostic method according to claim 7 wherein the method comprises performing at least one of or a combination of any two or more of an immunochemical test, a clinical chemical test, a nucleic acid test, a coagulation test, a hematology test, a mass spectrometric test.

9. The in-vitro diagnostic method according to claim 1 wherein the first diagnostic test is an immunochemical test and the second diagnostic test is a clinical chemistry test.

* * * * *